United States Patent [19]

Riveros

[11] 4,276,484

[45] Jun. 30, 1981

[54] METHOD AND APPARATUS FOR CONTROLLING CURRENT IN INDUCTIVE LOADS SUCH AS LARGE DIAMETER COILS

[76] Inventor: Carlos A. Riveros, 3832 Harrison Ave., Brookfield, Ill. 60513

[21] Appl. No.: 74,356

[22] Filed: Sep. 10, 1979

[51] Int. Cl.$^3$ .............................................. G01V 3/10
[52] U.S. Cl. .................................. 307/104; 361/146; 361/159; 361/3; 324/334; 307/137
[58] Field of Search ................. 307/104, 135, 137, 81, 307/85; 361/3, 5, 6, 7, 8, 13, 146, 159; 324/334, 343, 332, 333, 335, 336, 337, 338, 339, 340, 341, 342; 363/57

[56] References Cited

U.S. PATENT DOCUMENTS

| | | | |
|---|---|---|---|
| 2,958,808 | 11/1960 | Miller | 361/13 |
| 3,739,192 | 6/1973 | Oswald | 307/136 |
| 3,864,619 | 2/1975 | Tanaka et al. | 363/57 X |
| 4,170,037 | 10/1979 | Kimmel | 363/57 |

OTHER PUBLICATIONS

"Geophysical Techniques in Geothermal Exploration", C. J. Banwell, Geothermics (1970), Special Issue 2.
"Induction Methods in Prospecting for Hot Water", G. V. Keller, Geothermics (1970), Special Issue 2.
"Time-Domain Electromagnetic Sounding", Harthill, IEEE Transactions on Geoscience Electronics, vol. GE-14, No. 4, Oct. 1976.
"A Comparison of Two Electrical Probing Techniques", Keller and Rappolla, IEEE Transactions on Geoscience Electronics, vol. 6E-14, No. 4, Oct. 1976.
"An Electromagnetic Sounding Survey of the Summit of Kilauea Volcano, Hawaii,", Jackson & Keller, Journal of Geophysical Research, Sep. 10, 1972.

Primary Examiner—L. T. Hix
Assistant Examiner—James L. Dwyer
Attorney, Agent, or Firm—Kinney & Niblack

[57] ABSTRACT

A method and apparatus for controlling electric current in loads that are essentially inductive, such that sparking and "ringing" current problems are reduced or eliminated. The circuit apparatus employs a pair of solid state switches (each of which switch may be an array of connected or parallel solid state switching devices such as transistors) and means for controlling those switches such that a power supply supplying two d.c. voltages (e.g. positive 150 volts d.c. and negative 150 volts d.c.) at low resistance may be connected across an essentially inductive load (e.g. a 6 gauge wire loop one hundred meters in diameter) alternatively and such that the first solid state switch is turned off and the second is turned on such that both are not on at the same time but the first turned on and the other on in less time than the inductive time constant (L/R) so that the load is essentially always presented with a low resistance path across its input.

In this manner a steady AC current may be delivered to the load at a frequency desired. Shut-off problems are avoided by gradually shortening the period of switching to less than the time constant so that the maximum energy contained in the inductive load is reduced to approximately zero and dissipated in the inherent resistance.

The invention circuit may be employed by adjusting the timing of switching to deliver a desired waveform (such as sinusoidal) to the load.

1 Claim, 6 Drawing Figures

METHOD AND APPARATUS FOR CONTROLLING CURRENT IN INDUCTIVE LOADS SUCH AS LARGE DIAMETER COILS

FIELD OF THE INVENTION

The present invention relates to current and voltage supplies and controls therefor for driving essentially inductive loads.

BACKGROUND OF THE INVENTION

In supplying and controlling alternating electrical power to an essentially resistance-inductive load such as a large loop, as employed in electromagnetic geophysical exploration equipment, a difficult problem in large current arcing has been encountered. This arcing poses dangers to the operators and others near such equipment and leads to frequent wear and damage to the equipment. This problem exists in generating an alternating current and is especially severe in shutdown of the equipment. In the past this problem has been dealt with by simply replacing arc-worn contacts or equipment periodically and by isolating the human operator(s) from the equipment.

SUMMARY OF THE INVENTION

In accordance with the present invention, an electric circuit apparatus and control method are provided which greatly reduce the problems of arcing.

An electric circuit for supplying alternating current to an inductive load constructed in accordance with the present invention, comprises power supply means for supplying continuously direct current voltage with low internal impedance at at least two preselected levels. This may be, for example (only), one hundred and fifty volts positive (+150 v. dc) and one hundred and fifty volts negative (−150 v. dc). Of course, other values including zero volts for one such load may be employed.

The inventive circuit further includes at least two solid state switching means (which may, for example, be an array of parallel connected solid state switches) each of which is connected so as to connect or disconnect in direct current circuit connection one of the two preselected d.c. voltages from the power supply to the inductive load. The solid state switching means have an on-and-off time very much less than the inductive time constant (L/R) of the load to essentially present the inductive load with a constant low impedance voltage source. This arrangement substantially eliminates arcing and ringing of the inductive load on switching of the voltage input.

Although the laws of physics applicable to inductors are well known, the well-defined control of current through them has not been efficiently realizable. This problem is related to the fact that inductors are by definition storing energy in a magnetic field. Many devices such as motors, due to their inductive nature, subject the controller of their current, often a switch, to the effects of an "inductive kick." This "inductive kick" is simply arcing during the opening of the electric circuit. It is not a well-defined process unless the capacitative properties of the circuit as well as the ionization properties of the environment are known. It is also not efficient, because the energy in the arc is not essential to the operation of motors.

This invention controls the current through an inductor by always having a voltage source capable of fast voltage changes and with a low impedance across the inductor.

The invention, together with the advantages thereof, may best be understood by reference to the following description taken in connection with the accompanying drawings, in the several figures of which like reference numberals identify like elements.

DETAILED DESCRIPTION

Figure 1:
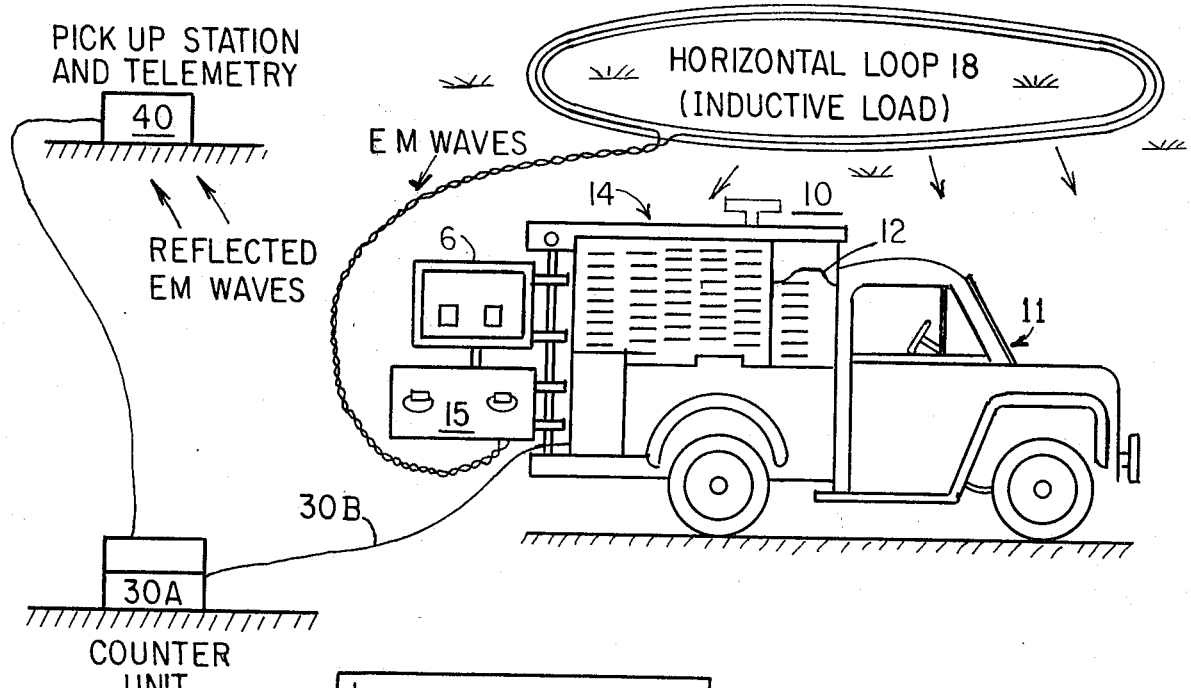
FIG. 1 is a side view partly in block and schematic form, of a portable system for geophysical exploration employing the present invention.

Referring now to FIG. 1, there is depicted a geophysical exploration rig 10 including a mobile truck 11, on which is mounted a motor-generator 12 which includes a suitable motive source and generator. In one prototype system which was constructed and successfully tested, the power source was a Hercules gasoline engine linked to an aircraft 60 KW, 400 HZ, 3φ (three phase) alternator.

This motor-generator 12 forms part of a power supply 14 which includes a full wave rectifier mounted in "crate" 15. This power supply 14 produces at least two voltages (e.g. 150 volts, positive, d.c. and 150 volts, negative, d.c.) and serves as a pair of low internal impedance d.c. voltage sources. Also connected to the power supply 14 and mounted in "crate" 15 is a solid state switching means 16 which may be an array of parallel connected power transistors, (FIG. 3) set to operate effectively as a first and second solid state switch (16P and 16N). These solid state switches are connected in parallel to each other and in series with the power supply and with an inductive load which in this case is a large horizontal loop of inductive wire 18. This may be, for example, a number 6 gauge copper wire in a four turn loop with a diameter of 100 meters (which size was actually used in one field test).

The system 10 includes a pick-up station and telemetry unit 40 which is located remotely from the loop 18 and truck 11 and includes a magnetometer for detecting Electromagnetic (EM) waves generated by loop 18 which are reflected by the underlying geological structures. The unit 40 is cable-connected to a control unit 30A which is likewise located remotely from the truck 11 (mainly as a matter of convenience to the operator who controls the systems from unit 30A, as the motor-generator 12 is noisy) and coupled thereto by a cable 30B.

Figure 2:
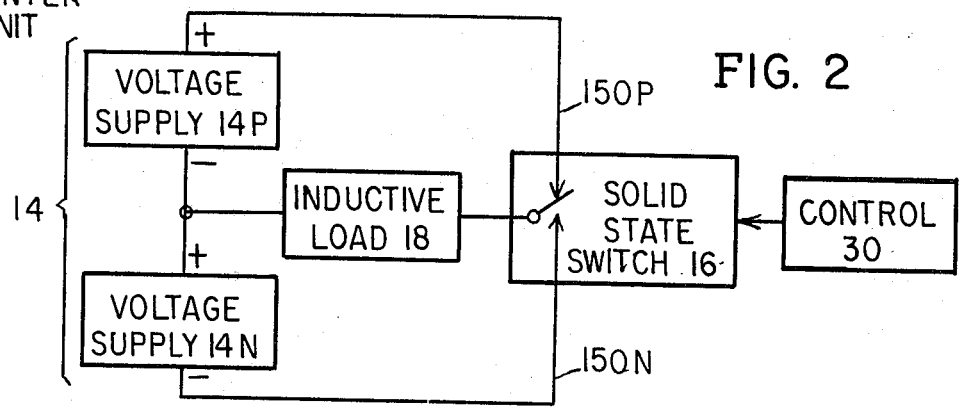
FIG. 2 is a simplified block diagram of the apparatus employed in the system of FIG. 1, which block diagram is useful in illustrating the operation of the present invention in its simplest form.

FIG. 2 is a block diagram of the electrical system 10. The power supply 14 produces two low internal impedance voltage sources 14P and 14N and the inductive load is connected between the solid state switching means 16. The solid state switching means 16 is in turn controlled by a control unit 26.

Figure 3:
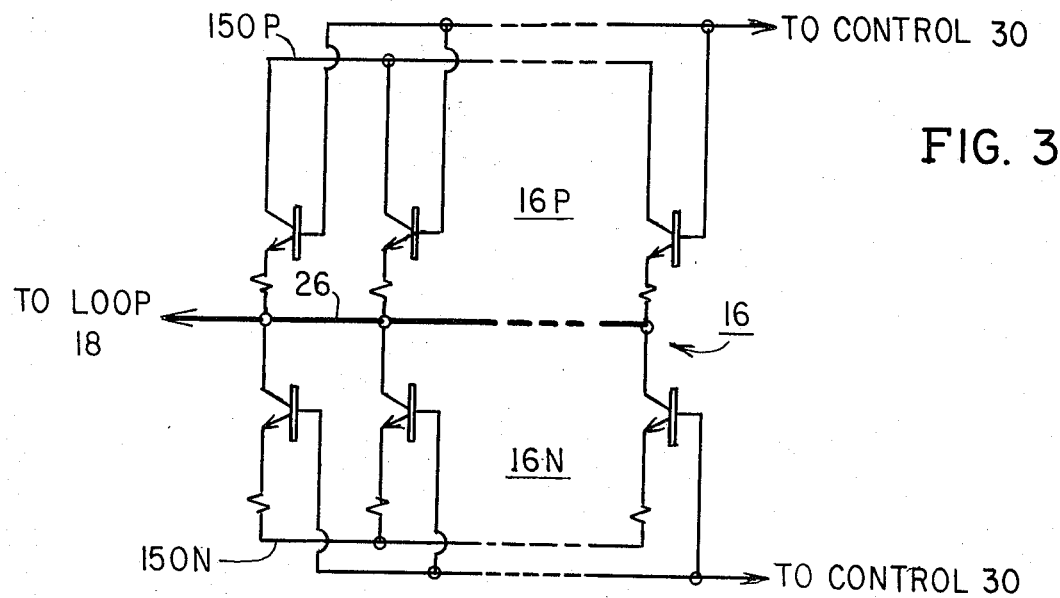
FIG. 3 is a circuit diagram of one portion of the circuit of FIG. 2.

One practical manner of achieving switching means 16 is depicted in FIG. 3 wherein an array of transistors 16P are connected with their collectors in common to the positive voltage line 150P and their emitters connected in common to a bus 26 connected to one side of the loop 18. A second set of parallel connected transistors 16N have their collectors connected in common to bus 26 and their emitter connected in common to line 150N. All of the control electrodes of the transistors 16P are controlled in common by control 30 and all of the control electrodes of the transistors 16N are controllable in common by the control 30.

The control 30 serves to switch the two solid state switches 16P and 16N so that they are never "on" at the same time, but are sequentially turned from "on" to "off" to on when it is desired to shift polarity of the current applied to the loop 18.

Referring again to FIG. 2, this is symbolized by the switch 16 being depicted as having a blade connected to line 26 and being controlled by control 30 to be connected alternatively to lines 150P or 150N.

Figure 4:
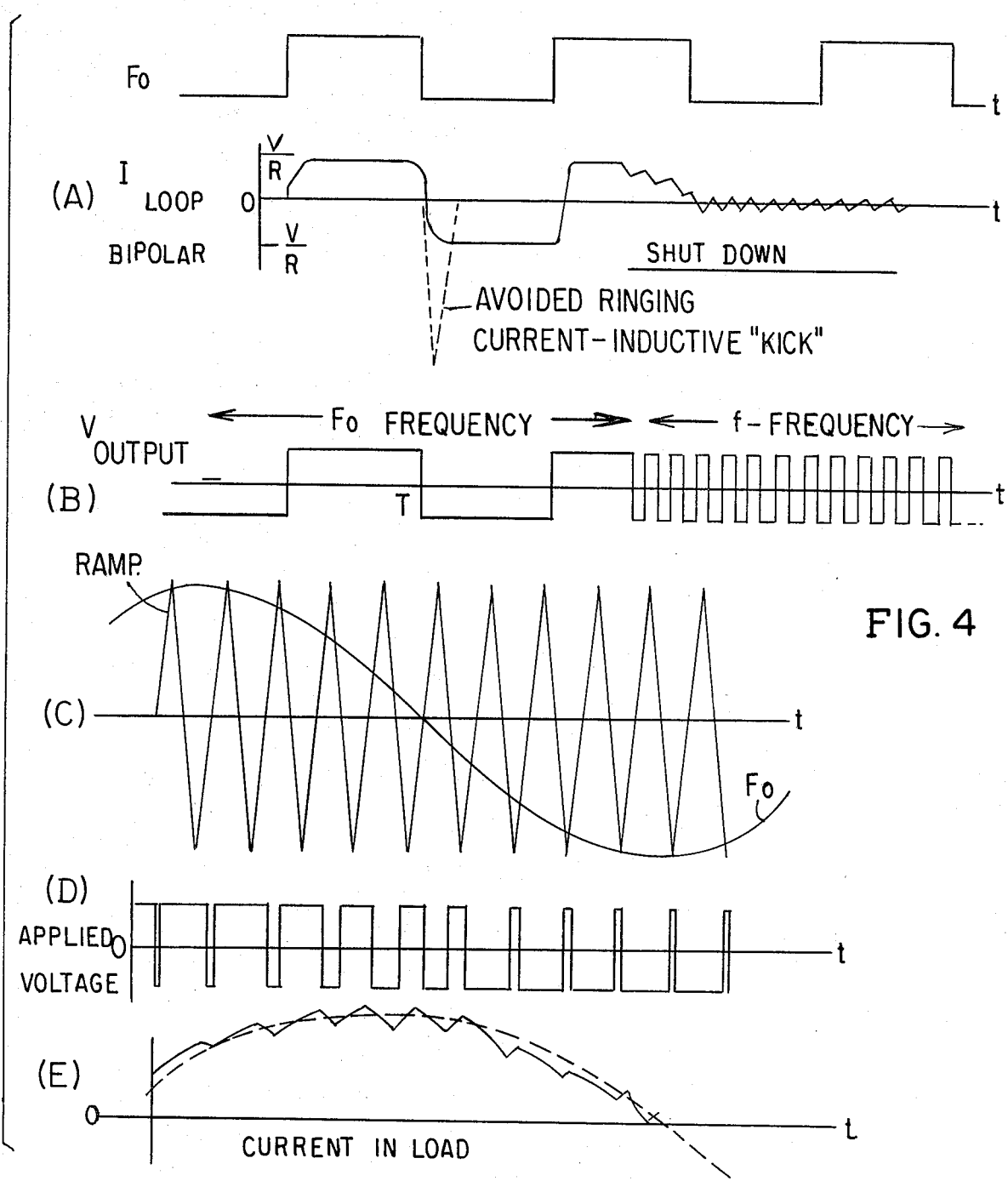
FIG. 4 is a set of graphical waveform representations of various electrical parameters of the system of FIG. 1 and 2, illustrating one particular way of operating the apparatus of FIG. 1 and 2, which graphical waveforms are useful for illustrating the method of operation of the apparatus of FIGS. 1 and 2.

Referring to FIG. 4, there are depicted certain current and voltage waveforms. The first two lettered waveforms are on the left hand side (A & B) and are for a steady state essentially square wave driving of the load 18 at Fo frequency.

As shown in waveform A, the current through the inductive load rises initially to a level V/R. For a number 6 wire, 1372 meters long, formed into four turns of 100 meters diameter (having 115 meters of pigtail lead to the truck 11) being fed by a 150 volt source, this current was about 63 amps. The current reaches approximately this value in ten periods of time called inductive time constant (L/R) wherein L is the inductance of the coil and R is its resistance.

Now if the voltage source (B) were disconnected at time T (the end of a positive half-cycle), the current in the loop would behave approximately as shown by the dashed line. That is, initially the current would start to drop. This dropping of current causes the magnetic field to collapse, which in turn generates an e.m.f. voltage in the loop aligned with that of the original voltage source. Inherent capacitance of the loop stores electric charge. The energy originally stored in the magnetic field would tend to oscillate between being stored in the inherent capacitance and the magnetic field until dissipated in the inherent resistance. This "ringing" would produce large voltages and current which in a normal switching system such as used before would result in arcing and discharging across contacts, i.e. the inductive "kick."

However, in accordance with the present invention, the loop 18 is presented with a low impedance negative voltage source at the time of switching through solid state switch means 16N. This controls the current and changes the energy back to inductive form without the excessive swings of voltage and current that could cause arcing. Essential to this process is that both switches 19N and 19P not be closed at the same time and that the time for sequentially opening and closing be very much less (by, for example, an order of magnitude) than the time constant (L/R) of the loop. This results in effectively keeping a low impedance shunt across the load 18 which prevents the development of "ringing" or inductive "kicks."

The switching time, i.e. the time for changing from "on" or conducting to "off" or non-conducting and vice-versa of such a solid state switch as 16P and 16N is typically in the area of approximately $10^{-5}$ seconds. This is much less than the intrinsic time constant (L/R) of the load 18. Therefore, the switches 16P and 16N can be sequentially changed in state before the load can react. Therefore, the load "sees" only a low impedance current shunt through one or the other of the voltage sources at all times during normal operation.

Thus in graph (A) of FIG. 4, instead of following the dashed line, the current follows the solid line. That is, it drops to a level ($-V/R$) determined by the negative voltage source. This process is continued to produce a square wave current in the loop 18. This current generates the EM wave which is then detected by the pick-up unit 40. Various frequency Fo can be and are used. The unit 40 may be moved about to obtain readings from other locations and those readings, through well-known computer techniques, may be used to generate a "map" of the underlying geophysical structures.

Figure 5:
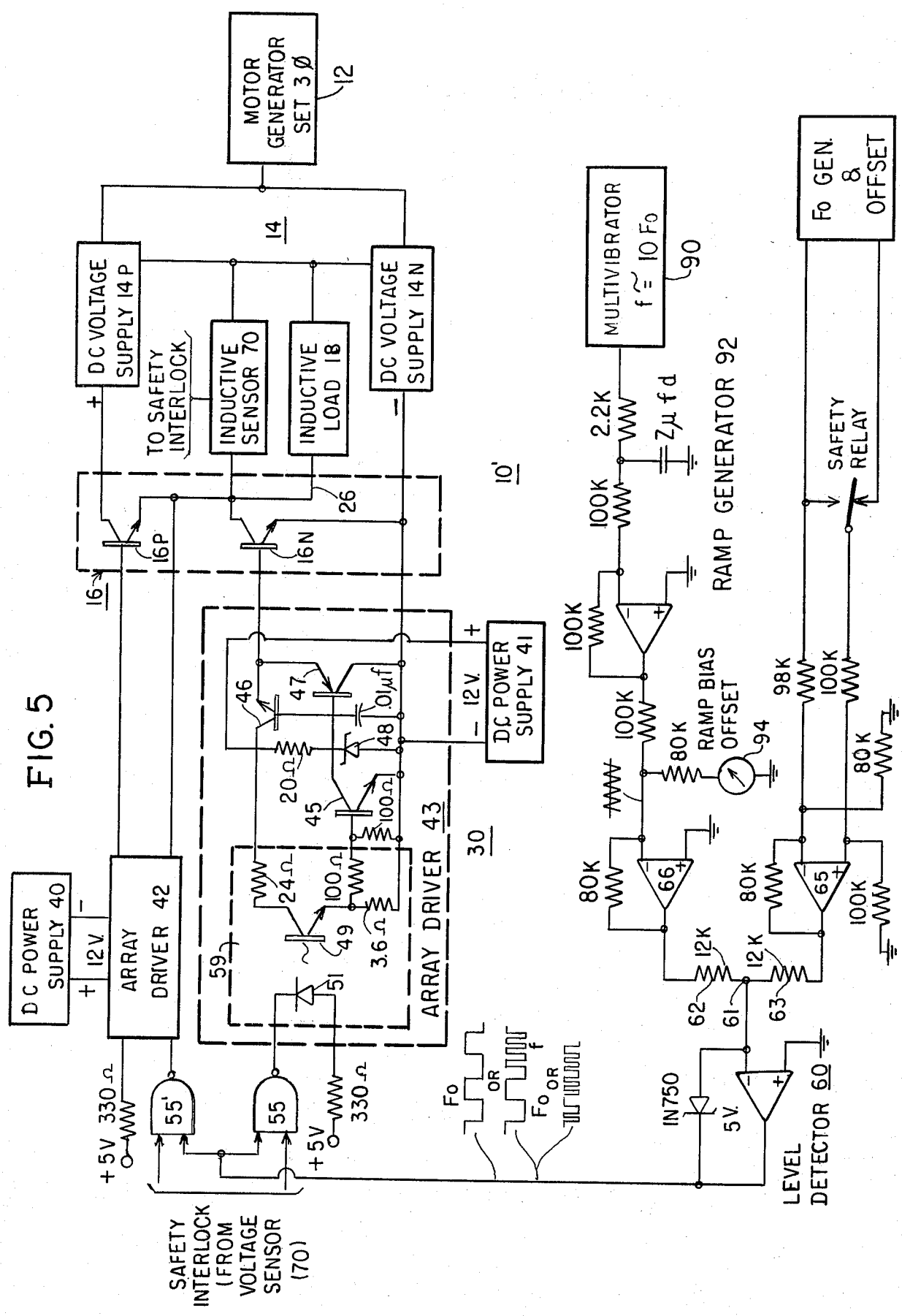
FIG. 5 is a circuit diagram, partly in block form, illustrating a particular circuit embodiment of the present invention employed in FIGS. 1–3.

Referring to FIG. 5, there is depicted one practical embodiment of the present system, an electromagnetic generator 10'. This includes the load 18, positive and negative voltage supplies 14P and 14N which are part of the power supply 14, including the motor generator rectifiers 12. The switching means 16 is here shown as single solid state switches 16P and 16N (but were in the practical prototype an array of such switches). The control system 30 includes array drivers 42 and 43, one of which, driver 43, is shown in detail, it being understood that driver 42 can be constructed identically.

The driver 43 is powered from an isolated power and voltage supply 41 (e.g. 12 v. dc) and includes an array of three transistors 45, 46 and 47, connected to amplify the output of an optical coupler 59. Such amplifiers and couplers are well known and will not be detailed here, but it is sufficient for our purposes to understand that the driver 43 serves to turn on or off the solid state switching means 16N in response to the applied signal to photo diode 51 whose light output turns "on" the transistor 49. The diode 51 is controlled by the output of a NAND gate 55 which has an input from a safety circuit which derives its signals from a voltage sensor 70 across the inductive load 18. This circuit and gates 55 and 55' serve to prevent both switches 16P and 16N from being closed simultaneously (and this prevents a short circuit through them).

The drivers 42 and 43 are controlled by the output from a level detector 60. This serves to deliver a "switch" signal that causes switches 16P and 16N to change state. The output of detector 60 is determined by an Fo frequency generator or fundamental oscillator 80 or by a multivibrator 90 which has a frequency output 10x that of the Fo. The generator 80 may be and was in the prototype a square wave generator, or it can be a sinosoidal wave generator or a special waveform may be produced.

The multivibrator 90 feeds a ramp generator 92 which may be controlled by a control 94. The outputs of the oscillator 80 and the ramp signal are coupled through operational amplifiers 65 and 66 and resistors 62 and 63 to one input of the level detector 60.

In normal operation as depicted at the left of graphs (A) and (B) of FIG. 4, the Fo dominates and is produced on the output of the level detector 60.

SHUT DOWN

As mentioned above, the problem of inductive kick and arcing is especially servere at shut down. In accordance with the present invention, a novel method of shutting down the current in the loop is employed. This uses the multivibrator generator of FIG. 5 to change the output fed to the drivers 42 and 43 from Fo to f, a frequency that is much higher (approximately 10x) than Fo. The result is shown in the right side of graphs (A) and (B). That is, the voltage applied is switched at a rate whose half period is such that the current flowing in the loop cannot approach its limiting value. Preferably this is above the intrinsic time constant (L/R). The result is that the current drops down to approximately zero. The energy in the magnetic field is deposited in the resistance of the wire. After a period of time, the switches 16 are simply both opened with no noticeable electrical effect and no "arcing."

Figure 6:
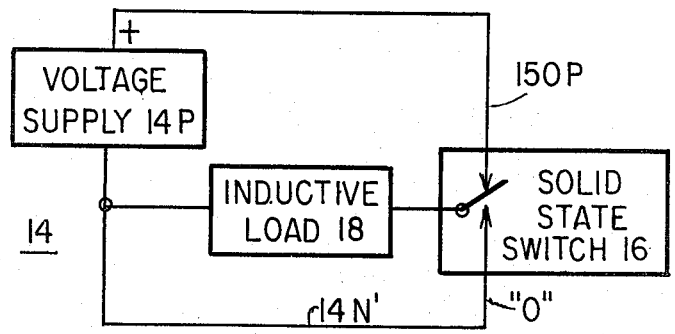
FIG. 6 is a simplified block diagram illustrating an alternative apparatus and method for practicing the present invention.

Referring to FIG. 6, an alternative embodiment of the invention is therein depicted in schematic form. In this case, the power supply 14 supplys a first voltage source 14P and a second voltage "source" 14N which in this case is "0". The solid state switching means is controlled in the same manner. Shutdown can be accomplished as before but with a small resulting current at termination.

Referring to graphs (C), (D), and (E) of FIG. 4, there is depicted a method of achieving more complex current waveforms in accordance with the present invention.

In graph (C) the waveforms of a sinusoidal output Fo and a ramp signal are compared by the level detector 60 to produce a variable length square wave of applied voltage (D) to the load. This results in the current in load (E) approximating the original Fo signal (somewhat delayed in phase). In this manner any input signal Fo can be approximated in the current through the load 18.

As mentioned above, a working system of the invention was constructed and successfully tested. While numerous variations in specific circuitry and apparatus may be employed, the following values and component indications are here given as an example only. While these values and components are believed to be accurately set out, the reader should verify them by well known engineering methods to insure against error in transcription. Of course, while this is presently the best mode contemplated by the inventor of practicing the invention, he and others may well decide to use alternatives in the future, especially in adapting the invention to other specific applications.

| | |
|---|---|
| Transistors 16P and 16N (with small 24 gauge wire connected in emitter load as a resistor) | IR5063/IR5066, Darlingtons |
| Optical Coupler 59 | FCD 820 |
| Transistor 45, 46 | 2N3716 |
| Transistor 47 | 2N3792 |
| Zener Diode 48 | IN2976B |
| NAND Gates 55, 55' | 7400 series |
| OP AMPS | μA741 |

Resistors are as shown. The switches 16P and 16N were constructed modularly and arrays of 6 to 60 transistors mounted in interchangeable modules with proper heat sink provisions were employed depending upon the load 18.

While two particular embodiments of the invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention.

I claim:

1. An electric circuit for controlling current in an inductive load, comprising
    a power supply which can supply essential power at a first and a second direct current constant voltage level with low internal impedance,
    solid state switching means connected to said power supply and comprising a first solid state switching means and a second solid state switching means, each of which solid state switching means having a switching time that is very much less than the intrinsic time constant of the inductive load, said first solid state switching means being connected in series with said first voltage level of said supply and with said inductive load so as to connect and not connect said first voltage across said load, and said second solid state switching means being connected in series with said second voltage level of said supply and with said load so as to connect and not connect said second voltage supply across said inductive load;
    control means for controlling said first and second switching means for sequentially switching them during normal operation such that they are never both switched on at the same time but such that they are sequentially switched in a period of time very much less than the intrinsic time constant of the inductive load, so that the load is effectively presented with a low impedance shunt through said power supply at all times and inductive kick and its resulting problems are avoided.

* * * * *

UNITED STATES PATENT OFFICE
CERTIFICATE OF CORRECTION

Patent No. 4,276,484　　　　　　　　Dated　Jun. 30, 1981

Inventor(s)　Carlos A. Riveros

It is certified that error appears in the above-identified patent and that said Letters Patent are hereby corrected as shown below:

col. 1, line 38: for "load" read --level--.

Signed and Sealed this

Twenty-second Day of September 1981

[SEAL]

*Attest:*

*Attesting Officer*　　　GERALD J. MOSSINGHOFF
　　　　　　　　　　　*Commissioner of Patents and Trademarks*